United States Patent
Donohue et al.

(10) Patent No.: US 10,194,010 B1
(45) Date of Patent: Jan. 29, 2019

(54) TECHNIQUES TO MANAGE CONTACT RECORDS

(71) Applicant: WhatsApp Inc., Menlo Park, CA (US)

(72) Inventors: Michael B. Donohue, Mountain View, CA (US); Clark Chen, Menlo Park, CA (US); Alan Liu, Menlo Park, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

(21) Appl. No.: 15/720,994

(22) Filed: Sep. 29, 2017

(51) Int. Cl.
*H04M 1/2745* (2006.01)
*H04M 1/725* (2006.01)
*H04L 12/58* (2006.01)

(52) U.S. Cl.
CPC ...... *H04M 1/274533* (2013.01); *H04L 51/12* (2013.01); *H04L 51/24* (2013.01); *H04L 51/36* (2013.01); *H04M 1/72597* (2013.01)

(58) Field of Classification Search
CPC ......... H04L 51/12; H04L 51/24; H04L 51/36; H04M 1/274533; H04M 1/72597
See application file for complete search history.

(56) References Cited

U.S. PATENT DOCUMENTS

| | | | | |
|---|---|---|---|---|
| 2004/0064734 A1* | 4/2004 | Ehrlich | ............. | H04L 51/12 726/30 |
| 2004/0137884 A1* | 7/2004 | Engstrom | ............. | H04L 51/16 455/414.1 |
| 2005/0033810 A1* | 2/2005 | Malcolm | ............. | H04L 51/12 709/206 |
| 2005/0044152 A1* | 2/2005 | Hardy | ............. | G06F 17/30861 709/206 |
| 2005/0117729 A1* | 6/2005 | Reding | ............. | H04M 3/2218 379/196 |
| 2007/0038720 A1* | 2/2007 | Reding | ............. | G06Q 10/107 709/217 |
| 2007/0055731 A1* | 3/2007 | Thibeault | ............. | H04L 51/04 709/204 |
| 2009/0182818 A1* | 7/2009 | Krywaniuk | ............. | H04L 51/12 709/206 |
| 2015/0128058 A1* | 5/2015 | Anajwala | ............. | H04L 67/22 715/739 |

* cited by examiner

Primary Examiner — Dinh Nguyen

(57) ABSTRACT

Exemplary embodiments relate to techniques for managing contact information received in the context of a messaging system. Messages may be received from known contacts which contain user contact records for third parties. Based on the trust relationship with the known contacts, the user contact record is placed in a contact record repository for later retrieval. When another message is received which either references the user contact record or is from the third party referenced in the user contact record, a dialog box is presented offering the user the opportunity to add the user contact record as an address entry in the address book of the device.

18 Claims, 13 Drawing Sheets

TECHNIQUES TO MANAGE CONTACT RECORDS

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to manage contact records. Some embodiments are particularly directed to techniques to manage contact records for messaging clients.

In an exemplary embodiment, the user receives a user contact record at a client device and the user contact record is stored in a contact record repository on the device. The user contact record may comprise, for example, a v-card. The user may then receive at the client device an incoming message from an initiating user account. The initiating user account may be identified in some manner, for example, by a phone number. The initiating user account is matched with the user contact record in the contact record repository and the contact information of the initiating user account is extracted from the matched user contact record. The extracted information regarding the initiating user account may be displayed in a dialogue on the client device. The user may have the option utilizing the dialogue to add an address book entry for the user contact record to the address book on the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
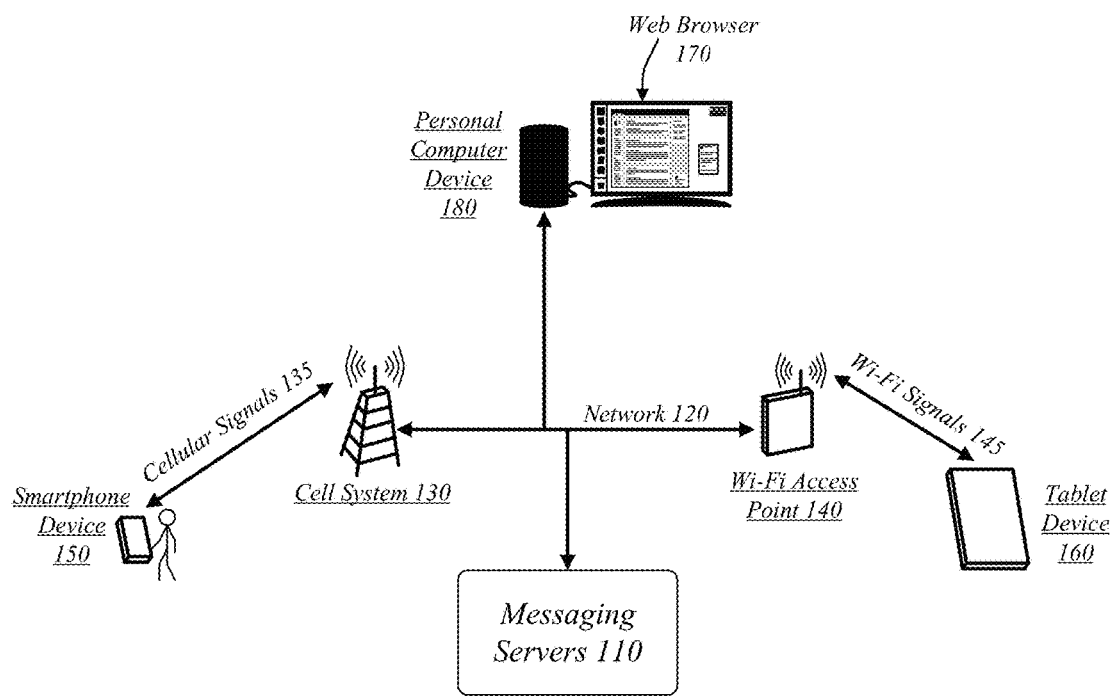
FIG. 1 illustrates an embodiment of a contact record management system.

A messaging system based primarily on smartphones may use phone numbers as the primary technique for identifying users within the messaging system. For example, a receiving messaging client may identify the sender of incoming messages by matching a phone number listed in the incoming messages to address book entries in an address book on a receiving client device. This technique may provide a receiving user with adequate information about an incoming message when the sender's phone number is in the receiving user's address book. However, where the sender's phone number is not in the receiving user's address book additional techniques may be desirable to inform the user as to the identity of the sender.

Users may share contact records to preconfigure messaging clients to recognize incoming messages from phone numbers not in the receiving user's address book. A contact record may comprise, without limitation, a vCard. The contact record may be stored on the receiving user's device and displayed to the user when an incoming message is received from a sending device with a phone number corresponding to the shared contact record. As a result, the embodiments can improve the user experience of users of a messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a contact record management system 100. In one embodiment, the contact record management system 100 may comprise a computer-implemented system having software applications comprising one or more components. Although the contact record management system 100 shown in FIG. 1 has a limited number of elements in a certain topology, it may be appreciated that the contact record management system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or any other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases, a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. In some embodiments, users can select whether a particular message thread uses end-to-end encryption (and thereby receive the additional privacy of the messaging servers being prevented from accessing the contents of messages) or doesn't (and thereby receive the benefit of the messaging system being able to programmatically access messages for the purpose of offering relevant services to the users).

The messaging system may use knowledge generated from interactions between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
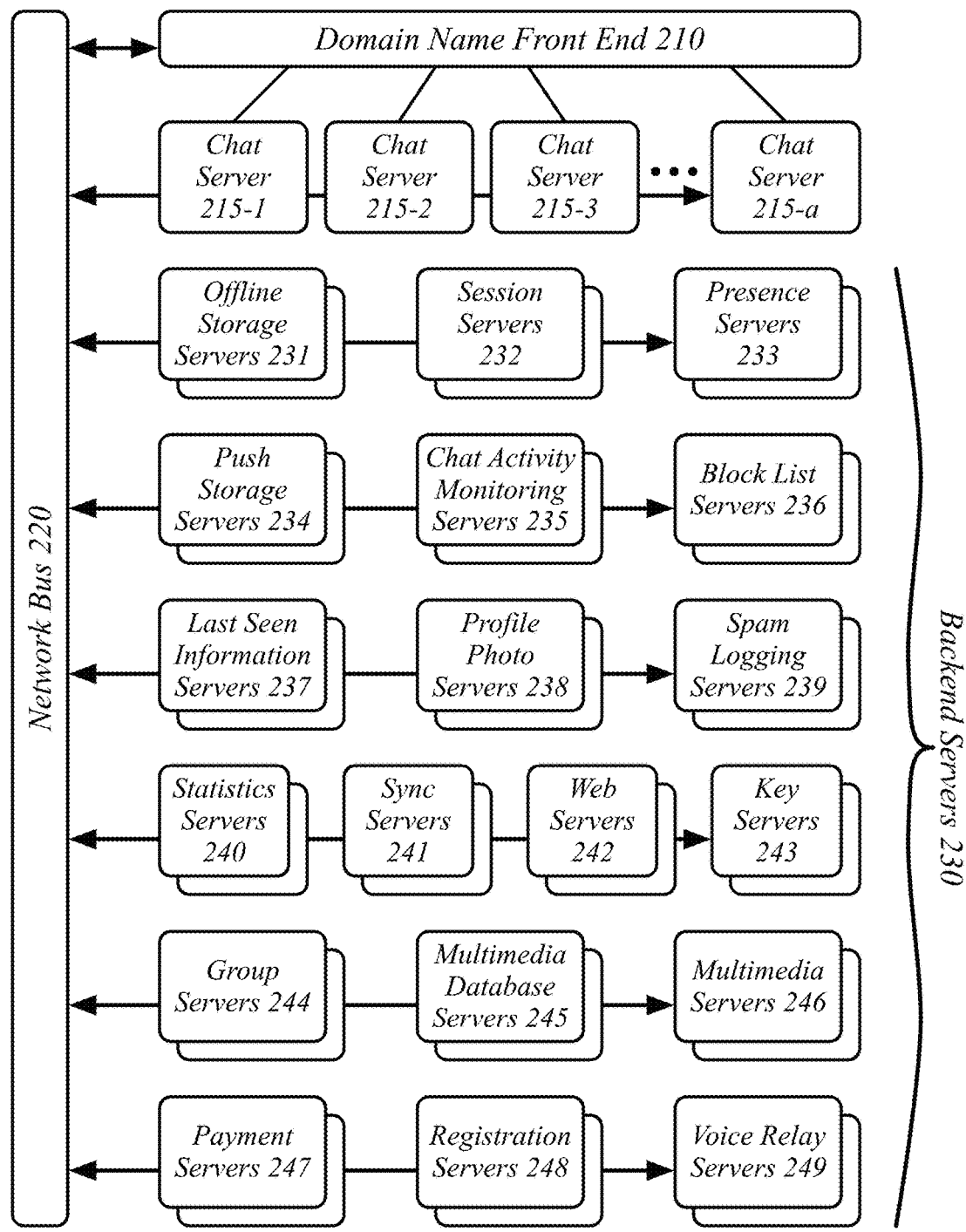
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the contact record management system 100 with the operations of the contact record management system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The various servers of the messaging system 200 are connected via a network bus 220. The network bus 220 provides network connectivity between the domain name front end 210, the servers of the messaging system 220, and various external devices, such as client devices. Each of the servers is independently connected to the network bus 220 such that they may independently communicate with each other and/or user devices via the network bus 220.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments, some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively, or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the contact record management system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3A:
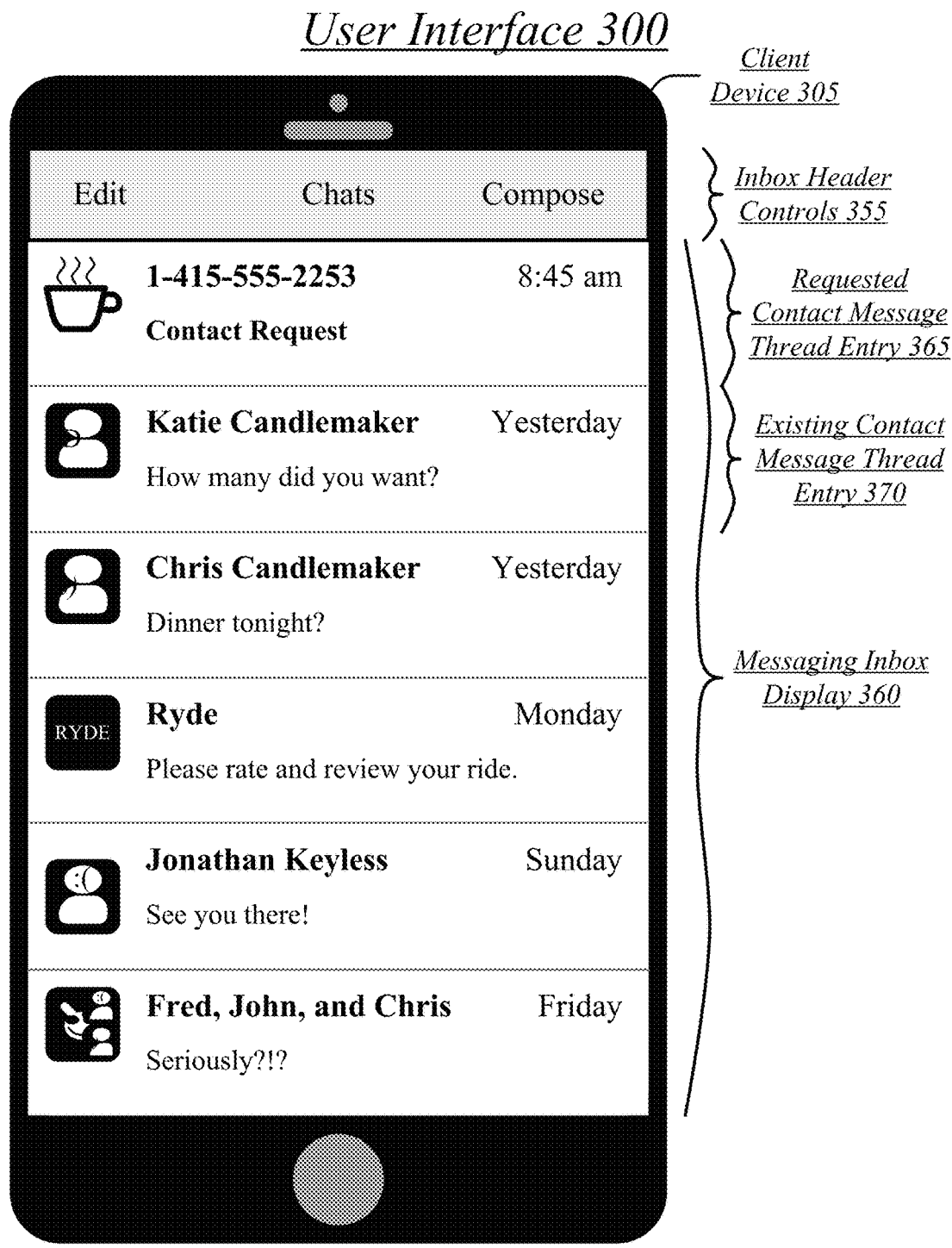
FIG. 3A illustrates an embodiment of an inbox user interface with a requested contact message thread entry.

FIG. 3A illustrates an embodiment of an inbox user interface 300 with a requested contact message thread entry 365.

The user interface 300 may comprise a display of a plurality of message threads in an inbox for a user account in a messaging inbox display 360. A portion of displayed message threads may be message threads with unread messages. A portion of displayed threads may be threads with read messages. In the illustrated embodiment of FIG. 3A, the user interface 300 may be scrolled downwards to reveal more threads.

The display of message threads in an inbox may comprise, for each message thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox. Message threads may show the name of the thread in a bold font to indicate an unread message and in a normal font to indicate that a message has been read.

A message thread entry for a message thread with a business entity may comprise the name of the business, the last-received message or last-exchanged message in the message thread, a last-received time or last-exchanged time for the last-received message or last-exchanged message in the message thread, and/or other information relating to the message thread.

Messaging partners may be associated with phone numbers used to uniquely identify them. Where a messaging partner is a business entity, it may be associated with a contact number for the business. For general user contacts, the name for the user may be assigned based on an address book entry for the user on the client device 305.

Message inbox display 360 may contain one or more existing contact message thread entries 370. Existing contact message thread entries 370 have been sent from a phone number associated with a contact having an address book entry in the address book on the client device. Thus, the existing contact message thread entries 370 may be displayed with the name associated with the contact in the address book of the client device which is associated with the phone number from which the message was received. Existing contact message thread entries 370 may comprise a one-to-one message thread or may comprise a group message thread, as shown in the last entry in FIG. 3A. When a user selects one of the existing contact message thread entries 370, the messaging inbox display 360 switches to a message thread interaction display 385, as shown in FIG. 3B.

Message inbox display 360 may also display one or more requested contact message thread entries 365. The requested contact message thread entry 365 is a message received from a phone number for which there is no associated address book entry in the address book of the device. Thus, the phone number from which the message was received may be displayed as the name of the thread. When the user selects the requested contact message thread entry 365, the messaging inbox display 360 will be replaced by the message thread interaction display 385 shown in FIG. 3C.

The user interface 300 may include inbox header controls 355. The inbox header controls 355 may empower various messaging-related actions. The inbox header controls 355 may comprise an edit control, the edit control operative to allow configuration of the messaging inbox, for example, allowing the user to delete one or more message threads. The inbox header controls 355 may comprise a compose control operative to allow the creation of a new message thread.

Figure 3B:
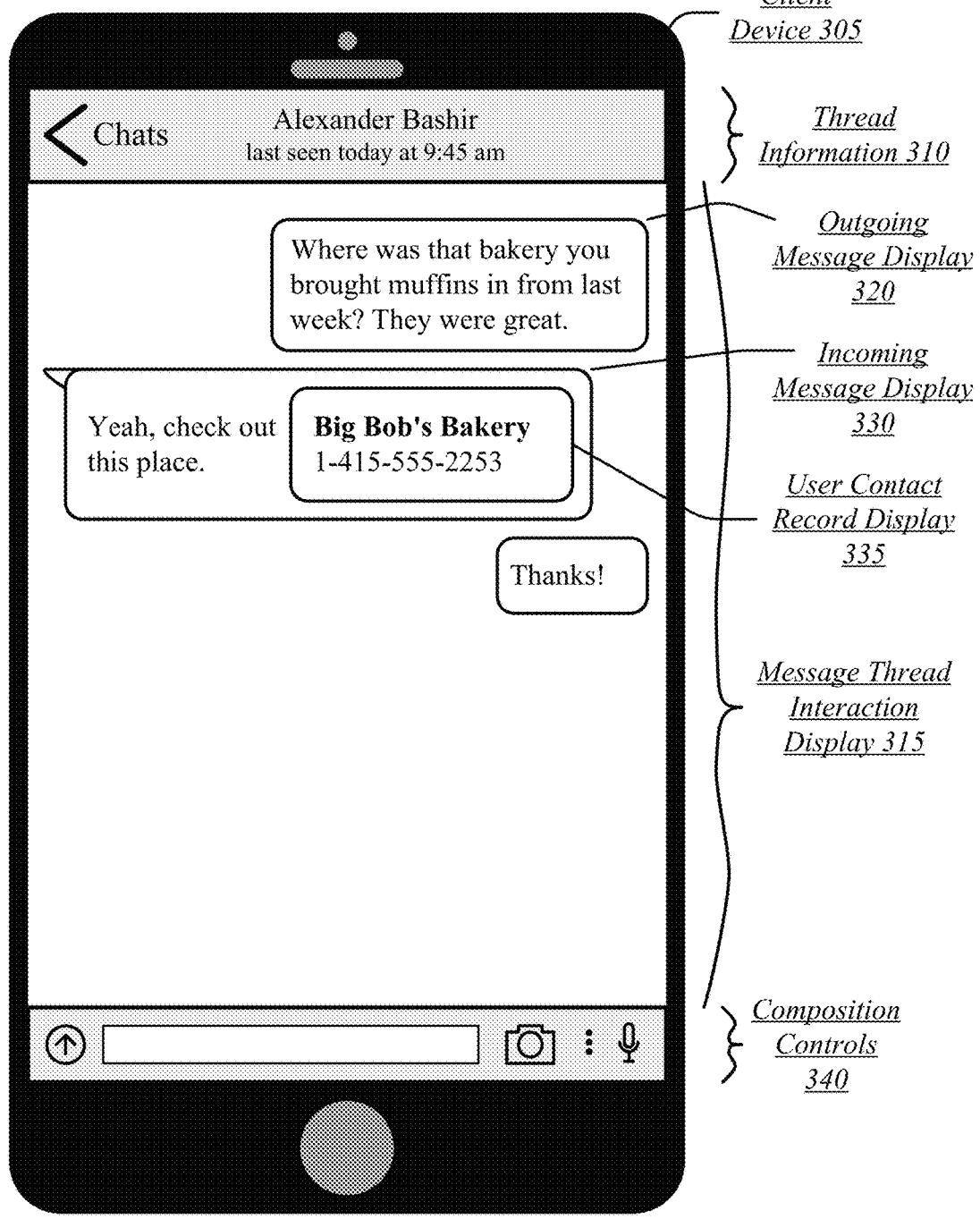
FIG. 3B illustrates an embodiment of a messaging user interface with a user contact record display.

FIG. 3B illustrates an embodiment of a messaging user interface 350 with a user contact record display 335.

A client device 305 may correspond to any device used to access a messaging system. While in the illustrated embodiment of FIG. 3B the client device 305 resembles a smartphone device, it will be appreciated that the techniques described herein may be used with any type of device. The features discussed with regards to a message thread may be applied to either one-on-one message threads or group message threads. The features discussed with regards to a message thread may be applied to a message thread in which a user engages with other individuals or with a business entity.

The user interface 350 may comprise a user interface for a message thread displayed on the client device 305. At least a portion of the message exchange for the message thread may be displayed in a message thread interaction display 315. A message thread interaction display 315 may comprise a display of one or more messages exchanged by the participants in the message thread.

The user interface 350 may include a display of thread information 310. The thread information 310 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users. The display of thread information 310 may also include a user control for returning to a list of message threads, shown as user interface 300 in FIG. 3A.

The user interface 350 for a message thread may include composition controls 340 that are persistently visible during the display of a message thread. Many, most, or nearly all of the composition controls 340 may empower access to further user interface controls for the performance of various tasks, such as text entry, speech entry, media selection, emoji selection, camera use, a social approval icon, etc.

Each of the one or more exchanges in the message thread displayed in message thread interaction display 315 may be represented by a particular message bubble, such as outgoing message display 320 or incoming message display 330. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from the background of the message thread interaction display 315. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the messaging system.

An outgoing message display 320 may be differentiated from an incoming message display 330 via a positioning of the message bubble. In some embodiments, message bubbles containing an outgoing message display 320 may be justified to the right side of the message thread interaction display 315, while message bubbles containing an incoming message display 330 may be justified to the left side of the message thread interaction display 315. In other or concurrent embodiments, incoming message display 330 may be differentiated from outgoing message displays 320 via the shape of the message bubble. For example, as shown in FIG. 3B, incoming message display 330 is configured with an arrow-like indicator on the left side of the message bubble, denoting to the user that the message bubble contains an incoming message display 330.

Incoming message display 330 may comprise a message bubble enclosing a text area wherein the body of the message is displayed (i.e., text typed in by the sender of the message) and, optionally, a user contact record display 335, in which information from a user contact record is displayed. In one embodiment, the user contact record display 335 may comprise information extracted from a v-card. In other embodiments, the user contact record display may comprise information extracted from any structured form of contact information. In yet another embodiment the user contact record display 335 may comprise information extracted from unstructured contact information.

The user contact record display 335 may be displayed within the message bubble with all or a portion of the contact information contained in the user contact record being displayed in the user contact record display 335. In one embodiment, as shown in FIG. 3B, the user contact record display comprises the name of the entity and the entity's phone number. In other embodiments, other information may be displayed. The recipient of the message on the client device may have the option to select which information is displayed. The entity whose contact information is contained in the contact record may be an individual or a business.

In some embodiments, multiple user contact records may be attached to the same message and, in some embodiments, the multiple user contact records may be representative of participants in a group message thread. In some embodiments, the user contact record may be received independently of an incoming message.

In one embodiment, the user contact record may not be authorized for storage in the contact record repository unless the user contact record has been received from a known contact of the owner of the device, for example, a contact matching an address book entry in the address book on the client device. In another embodiment, the user contact record may be authenticated for storage in the contact record repository based on the sending user account being a participant in a messaging thread. In yet another embodiment, user contact record may be authenticated for storage in the contact record repository based on the sending user account being a participant in a group messaging thread being administered by an administrator user account that matches an address book entry in the address book for the client device.

If the user contact record is not authorized for storage in the contact record repository, the user contact record will not be stored. In one embodiment, when user contact record display 335 is shown within the incoming message display 330, the user may select the user contact record display 335, which may provide the user with the option to save the contact record displayed in the user contact record display 335 as an address book entry in the address book on the client device, in which case, the user contract record would not be added to the contact record repository.

In some embodiments, a participant in a group message thread may send a request to the administrator of the group message thread requesting to receive a plurality of user contact records from the administrator client device, where the plurality of user contact records corresponds to participants in the group message thread. In such a case, one or more of the plurality of user contact records received from the administrator may be unknown participants in the group messaging thread, based upon the lack of an address book entry in the address book on the client device. The plurality of user contact records may nevertheless still be authorized to be placed in the contact record repository based upon their participation in the group messaging thread.

When a user contact record has been authorized to be placed in the contact record repository, the user contact record is stored in the contact record repository on the client device. User contact records stored in the contact record repository on the client device may be indexed and searchable by the phone number contained in the user contact record. Additionally, the entry for the user contact record in the contact record repository may contain a reference to the incoming message or series of messages with which the contact record is associated, that is, the message or series of messages with which the contact record was received on the client device.

Figure 3C:
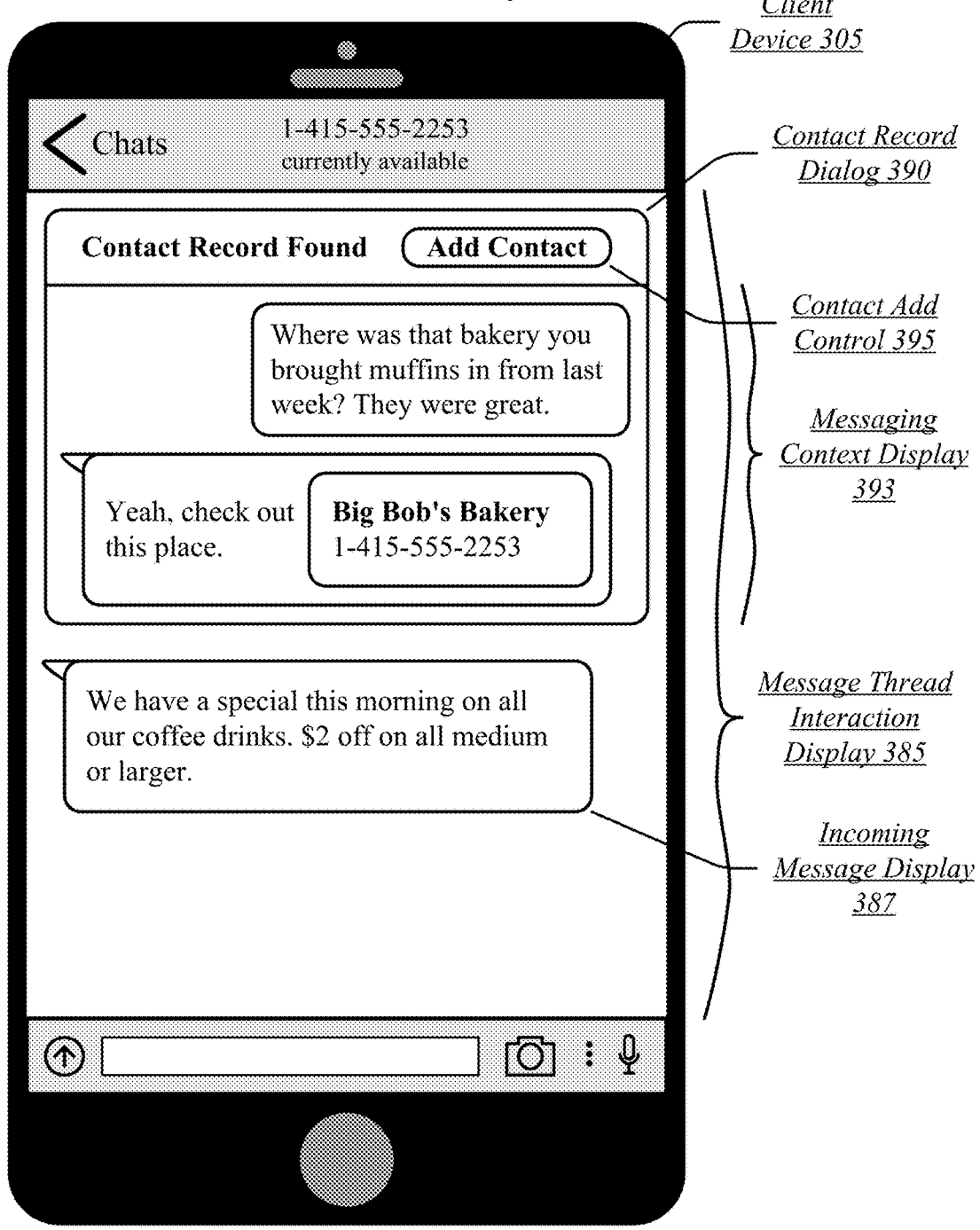
FIG. 3C illustrates an embodiment of a messaging user interface with a contact record dialog.

FIG. 3C illustrates an embodiment of a messaging user interface 375 with a contact record dialog 390. An incoming initiating message, as shown in incoming message display 387, may be received from an initiating user account. The initiating user account may be associated with an initiating client device and an incoming initiation message may be received at the client device from the initiating client device. The initiating user account will typically be identified using a phone number from which the message was received, but any other data associated with the initiating user account may be used. In the case where there is currently no address book entry in the address book of the client device associated with the incoming message, the contact record repository on the client device may be searched for a match with the identifying information of the initiating user account from which the message was sent. If a match is found in the contact record repository, a contact record dialog 390 may be displayed.

The contact record dialog 390 may comprise a messaging context display 393 and a contact add control 395. If no match is found in the contact record repository, a spam dialogue may be displayed in lieu of contact record dialog 390 warning the user that the received message shown in requested contact message thread entry 365 may be spam.

The messaging context display 393 may display one or more message bubbles, comprising both incoming message displays 330 and outgoing message displays 320, to provide a context for the user indicating when and under what circumstances the user contact record was received and added to the contact record repository. When the contact record was added to the contract record repository, the associated messages were also referenced in the contact record repository and associated with the user contact record, to enable the ability to retrieve the messages for display in the messaging context display 393. The messaging context display 393 is meant to provide a context to the user of the device regarding the circumstances under which the contact record was received, such as to aid the user in deciding whether or not to add the contact record as a contact in the address book of the client device.

There may be instances where multiple entries for the user contact record exist in the contact record response repository. This may happen, for example, when more than one known contact has sent the user contact record to the device. Under these circumstances, multiple instances of the user contact information shown in the user contact records may be displayed, and the user may be given the option to choose one of the user contact records to be converted to an address book entry in the address book of the client device.

A contact add control 395 may also be provided in the contact record dialog 390. Contact add control 395 may be selected by the user of the of the device to add the information contained in the user contact record displayed in the messaging context display 393 as an address book entry in the address book on the client device. Upon receipt of the user's acceptance, as indicated by selecting the contact add control 395, an address book entry containing the contact information from the user contact record is added to the address book for the client device. In one embodiment, the user contact record contains structured data which may correspond on a one-to-one basis with the fields in an address book entry in the address book on the client device. In some embodiments, the user may have the ability to edit the information prior to the creation of the address book entry. In the circumstance where the user chooses to add the contact record as an entry in the address book on the client device, the contact record may be deleted from the contact record repository.

Figure 4:
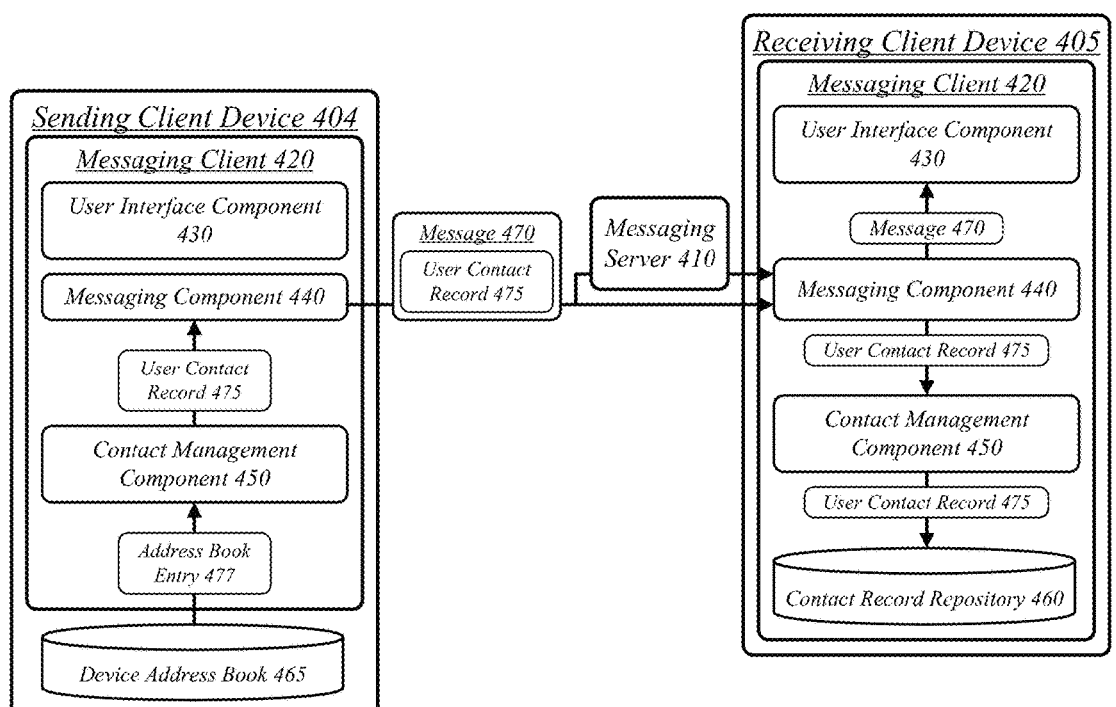
FIG. 4 illustrates an embodiment of a contact record management system sharing a user contact record.

FIG. 4 illustrates an embodiment of a contact record management system 100 sharing a user contact record 475.

A sending client device 404 and receiving client device 405 may each be one of a plurality of client devices communicating using a messaging system and implementing the contact record management system 100. The client devices 404, 405 each execute a messaging client 420. The messaging client 420 comprises a plurality of components. The plurality of components may comprise software components. The components of the messaging client 420 may include additional components to those described here and the operations of the messaging client 420 may be divided between components in different configurations in different embodiments. The configuration shown here is used only as an exemplary embodiment.

The contact record management system 100 of FIG. 4 is presented in the context of a sending client device 404 and a receiving client device 405. However, as should be realized, each of sending client device 404 and receiving client device 405 will have all components shown in the other to enable each client device to act as both sending client device 404 and receiving client device 405.

The messaging client 420 may comprise a messaging component 440. The messaging component 440 may be generally arranged to perform the interactions between the messaging client 420 and the messaging system. The messaging component 440 may send network communication to and receive network communication from a messaging server 410 for the messaging system, or may initiate peer-to-peer communication between sending client device 404 and receiving client device 405.

The messaging client 420 may comprise a user interface component 430. The user interface component 430 may be generally arranged to present information to a user of a client device and receive user commands from the user of the client device. The user interface component 430 may display visual information, output audio information, and otherwise present information to a user. The user interface component 430 may receive touch commands, text commands, voice commands, and any other sort of command for the operation of the messaging client 420.

The contact record management system 100 includes a messaging server 410. The messaging server 410 may execute on a messaging server device. The messaging server 410 is generally arranged to perform messaging services for client devices. The messaging server 410 may comprise one or more software or hardware components. The messaging server 410 is generally arranged to receive, store, and forward messages between users of the messaging system. However, in other embodiments, the client devices 404, 405 may communicate directly without the use of an intervening messaging server 410, such as where peer-to-peer messaging techniques are used.

A user of sending client device 404 composes message 470 using user interface component 430, and wishes to include user contact record 475 with message 470. User interface component 430 may be operative to allow the user to select an address book entry 477 from the device address book 465. Contact management component 450 may convert address book entry 477 into user contact record 475. Preferably, user contact record 475 is a structured record containing identifiable fields of information corresponding to fields in address book entry 477. In one embodiment, user contact record 475 may comprise a v-card. Contact management component 450 provides user contact record 475 to messaging component 440, where it is included with message 470 and sent to the receiving client device 405, either through messaging server 410 or via a peer-to-peer connection between sending client device 404 and receiving client device 405.

Receiving client device 405 receives message 470 via messaging component 440. The message 470 is displayed by user interface component 430 such as to be visible to the user of receiving client device 405. The user contact record 475 contained in message 470 is sent to contact management component 450. Contact management component 450 may determine if message 470 has been received from a known sending client device 404, or otherwise authorized as discussed previously, and, if so, user contact record 475 may be stored in the contact record repository 460. The determination of whether message 470 has been received from a known sending client 404 may be accomplished by determining if the identifying information associated with message 470 is contained in an address book entry in the address book of the receiving client device 405.

In certain embodiments of the invention there may be a limit on how long a particular user contact record 475 is retained in contact record repository 460. In one embodiment, a user contact record 475 may be deleted from the contact record repository 460 when the user has added the information contained in the user contact record 475 as an address book entry 477 in the device address book 465. In another embodiment, if the user deletes the message 470 which contained user contact record 475, user contact record 475 may be removed from the contact record repository 460. In yet another embodiment, the user contact record 475 may be deleted from contact record repository 460 after a predetermined period of time has elapsed.

Figure 5:
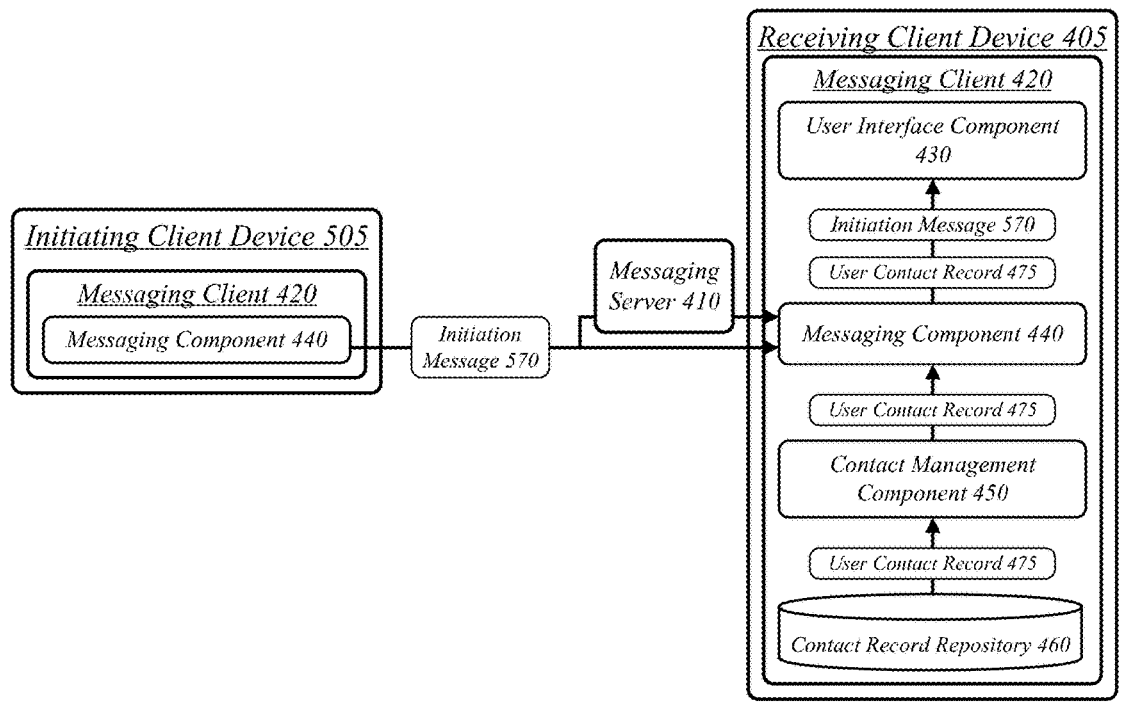
FIG. 5 illustrates an embodiment of a contact record management system processing an initiation message.

FIG. 5 illustrates an embodiment of a contact record management system 100 processing an initiation message 570. The initiating message 570 is being received from initiating client device 505. Messaging component 440 may receive initiation message 570 from initiating client device 505 either via messaging server 410 or via a peer-to-peer connection between initiating client device 505 and receiving client device 405. Initiation message 570 is sent by messaging component 442 to user interface component 430 for display to the user of receiving client device 405.

In this case, receiving client device 405 will not have an address book entry in its address book associated with initiating client device 505. Thus, the initiating client device 505 is unknown to receiving client device 405. The contact management component 450 may be operative to determine that the initiating user account does not match any existing address book entry in the address book for the client device, in which case contact management component 450 will attempt to match the user contract record 475 with a record stored in the contact record repository 460.

Contact management component 450 searches contact record repository 460 for user contact record 475 associated with initiating client device 505. Contact record repository 460 may be indexed by phone number. The user contact record 475 associated with initiating client device 505 may be discovered by searching contact record repository 460 using the phone number from which initiation message 570 was received and matching that phone number with a phone number contained in a user contact record 470 in the contact record repository 460. As should be realized, any other identifying information may also be used to uniquely identify initiating client device 505 and to index contact record repository 460.

If a user contact record 475 associated with initiating client device 505 is found in contact record repository 460, contact management component 450 will retrieve user contact record 475 from contact record repository 460 and send it to user interface component 430, which may display contact record dialogue 390. Contact record dialogue 390 displays the messaging context display 393 and allows the user to add the user contact record 475 as an address book entry 477 in the device address book 465 when the user selects contact add control 395.

Included herein is a flowchart representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
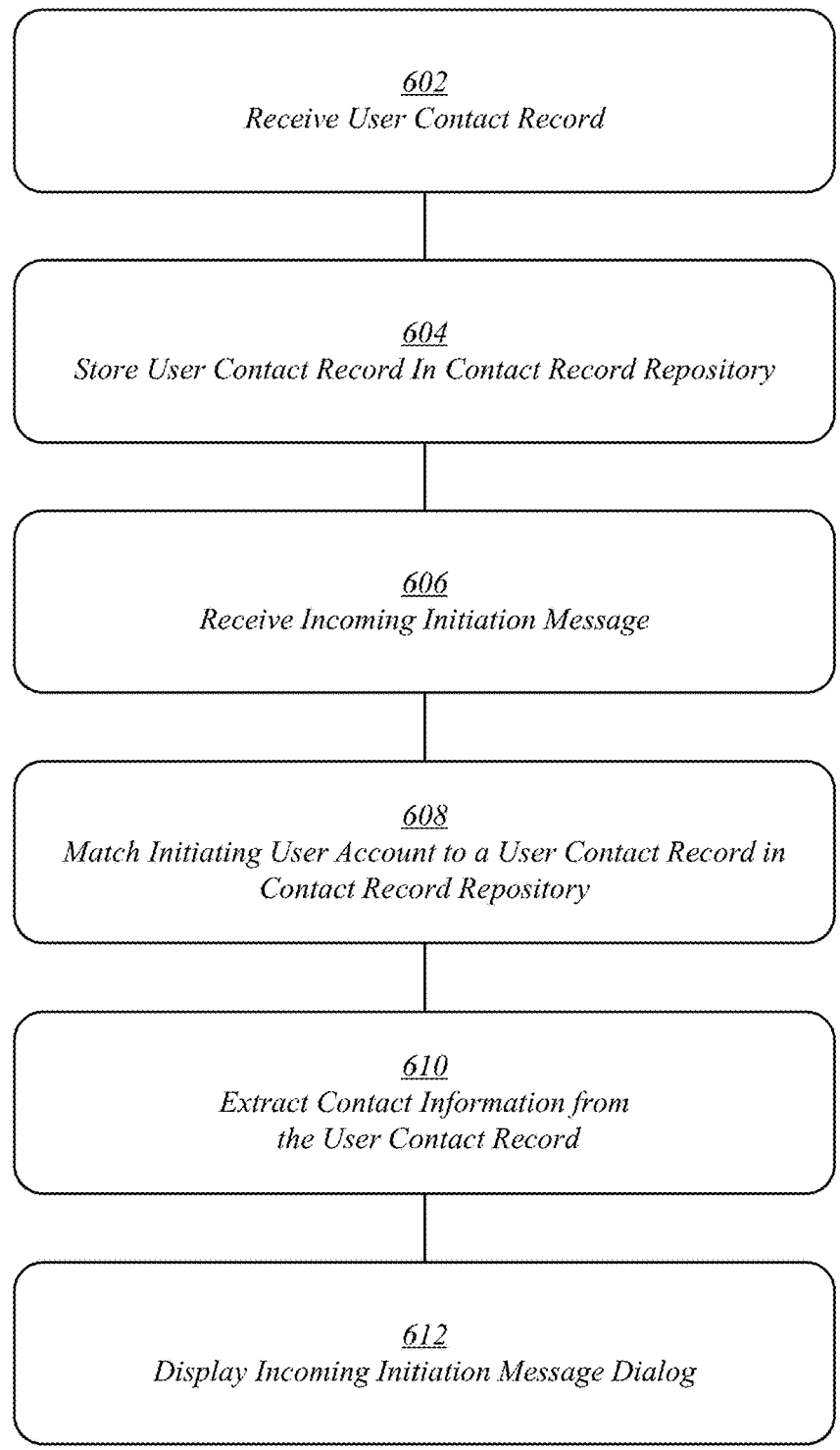
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein and comprises exemplary logic for performing the functions of the systems and methods described herein.

In the illustrated embodiment shown in FIG. 6, the logic flow 600 may, at 602, receive a user contact record. The user contact record may comprise a structured record, for example, a v-card, containing contact information for an individual or business.

At 604, the logic flow 600 may store the user contact record in a contact record repository. In some embodiments, the user contact record may only be stored in the contact record repository when it has been received from a known contact, or is been otherwise authorized as discussed previously. The determination of whether the contact is a known contact may be accomplished by searching the address book on the device for an address book entry corresponding to the user account from which the user contact record has been received. In some embodiments, the user contact record may be received in the context of a one-to-one message thread. In other embodiments, the user contact record may be received in the context of a group messaging thread, that is, a message in which three or more entities are participating. In the case of a user contact record received from an unknown participant in a group messaging thread, the user contact record may be added to the contact record repository if the administrator of the group messaging thread is a known contact.

At 606, the logic flow 600 may receive an incoming initiation message. The incoming message initiation is a message received from an unknown contact, that is, there is no address book entry in the address book of the device receiving the message. In this case, the incoming message initiation contains only the message, and no user contact record.

At 608, the logic flow 600 may match the account from which the message was initiated to a user contact record already contained in the contact record repository on the device. The matching of the initiating user account to a user contact record in the contact record repository may be accomplished by matching the phone number from which the message was received to a phone number contained in a user contact record in the contact record repository. This presumes that the user contact record associated with the initiating user account is already in the contact record repository, which indicates that the user contact record had previously been received from a known contact and stored in the contact record repository.

At 610, logic flow 600 may extract contact information from the user contact record which was retrieved from the contact record repository. It is presumed that the user contact record is a structured record which enables easy identification of various fields therein.

At 612, logic flow 600 may display the incoming initiation message dialogue. The incoming initiation message dialogue displays all or a portion of the contact information extracted from the user contact record at 610 in an organized manner on the user display of the device. Also displayed is an "add contact" button which, if selected by the user, will cause the contact information to be saved as an address entry in the address book of the device. Optionally, the initiation message dialogue may also display message bubbles that were associated with the initial receipt and storing of the user contact record, to provide a context for the user in deciding whether or not to store the extracted contact information as an address entry in the address book of the device.

Logic flow 600, shown in FIG. 6, provides an exemplary embodiment of the systems and methods described herein. The embodiments are not meant to be limited to this example.

Figure 7:
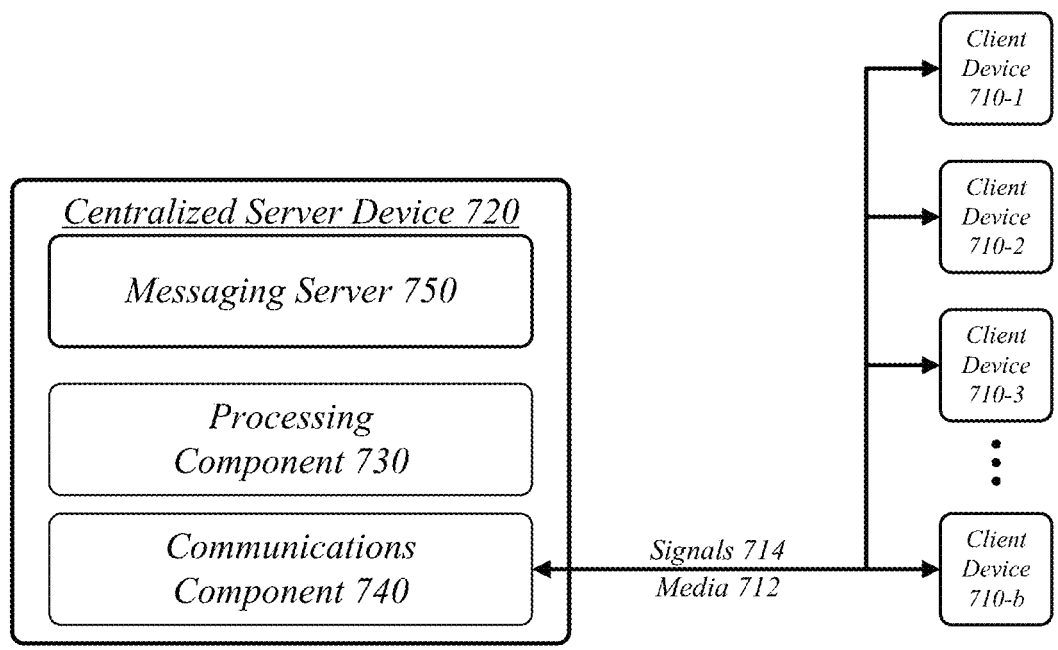
FIG. 7 illustrates an embodiment of a centralized system for the system of FIG. 1.

FIG. 7 illustrates a block diagram of a centralized system 700. The centralized system 700 may implement some or all of the structure and/or operations for the contact record management system 100 in a single computing entity, such as entirely within a single centralized server device 720.

The centralized server device 720 may comprise any electronic device capable of receiving, processing, and sending information for the contact record management system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the contact record management system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the contact record management system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation.

The centralized server device 720 may execute a messaging server 750. The messaging server 750 may comprise a messaging server of a plurality of messaging servers 110. The messaging server 750 may provide messaging operations for a plurality of client devices 710, receiving and sending messages between the client devices 710. The client devices 710 may correspond to one or more of a smartphone device 150, tablet device 160, personal computer device 170, and/or any other client device.

Figure 8:
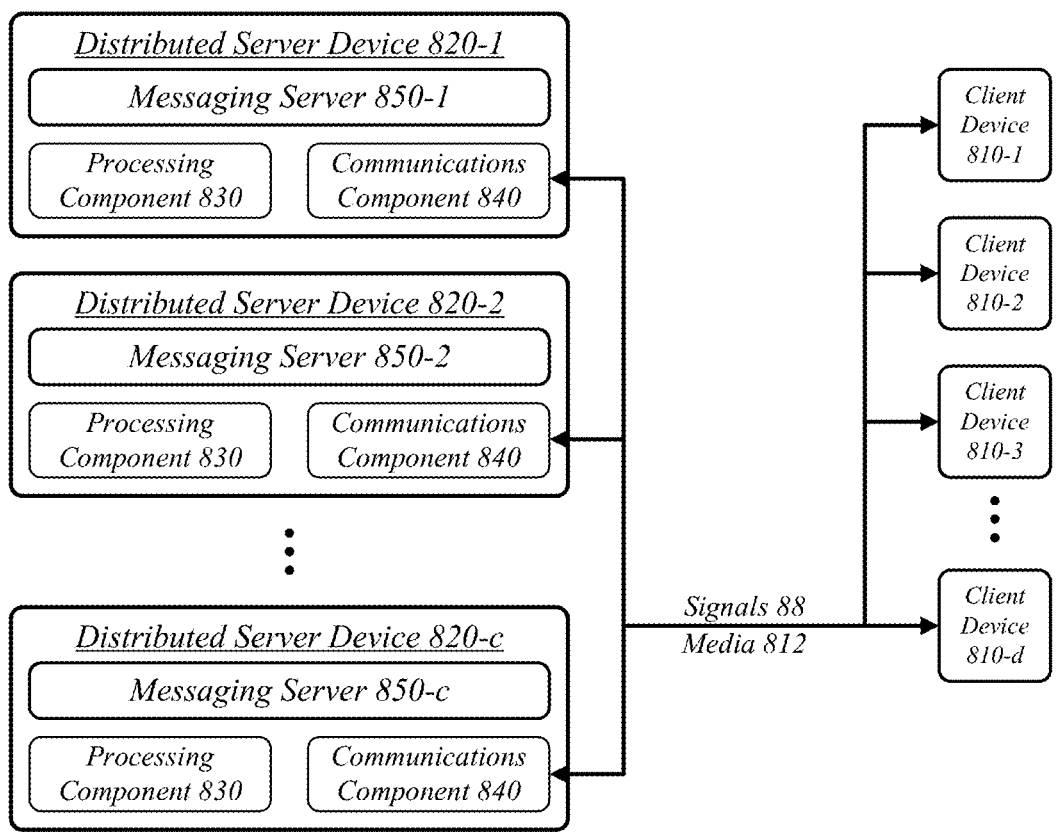
FIG. 8 illustrates an embodiment of a distributed system for the system of FIG. 1.

FIG. 8 illustrates a block diagram of a distributed system 800. The distributed system 800 may distribute portions of the structure and/or operations for the contact record management system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 820. In general, the distributed server devices 820 may be the same or similar to the centralized server device 720 as described with reference to FIG. 7. For instance, the distributed server devices 820 may each comprise a processing component 830 and a communications component 840 which are the same or similar to the processing component 730 and the communications component 740, respectively, as described with reference to FIG. 7. In another example, the distributed server devices 820 may communicate over a communications media 812 using communications signals 814 via the communications components 840.

The distributed server devices 820 may comprise or employ one or more server programs that operate to perform various methodologies in accordance with the described embodiments. In one embodiment, for example, the distributed server devices 820 may each execute one of a plurality of messaging servers 850. The messaging servers 850 may comprise messaging servers 110 for a messaging system. The messaging servers 850 may provide messaging operations for a plurality of client devices 810, receiving and sending messages between the client devices 810. The client devices 810 may correspond to one or more of a smartphone device 150, tablet device 160, personal computer device 180, and/or any other client device.

Figure 9:
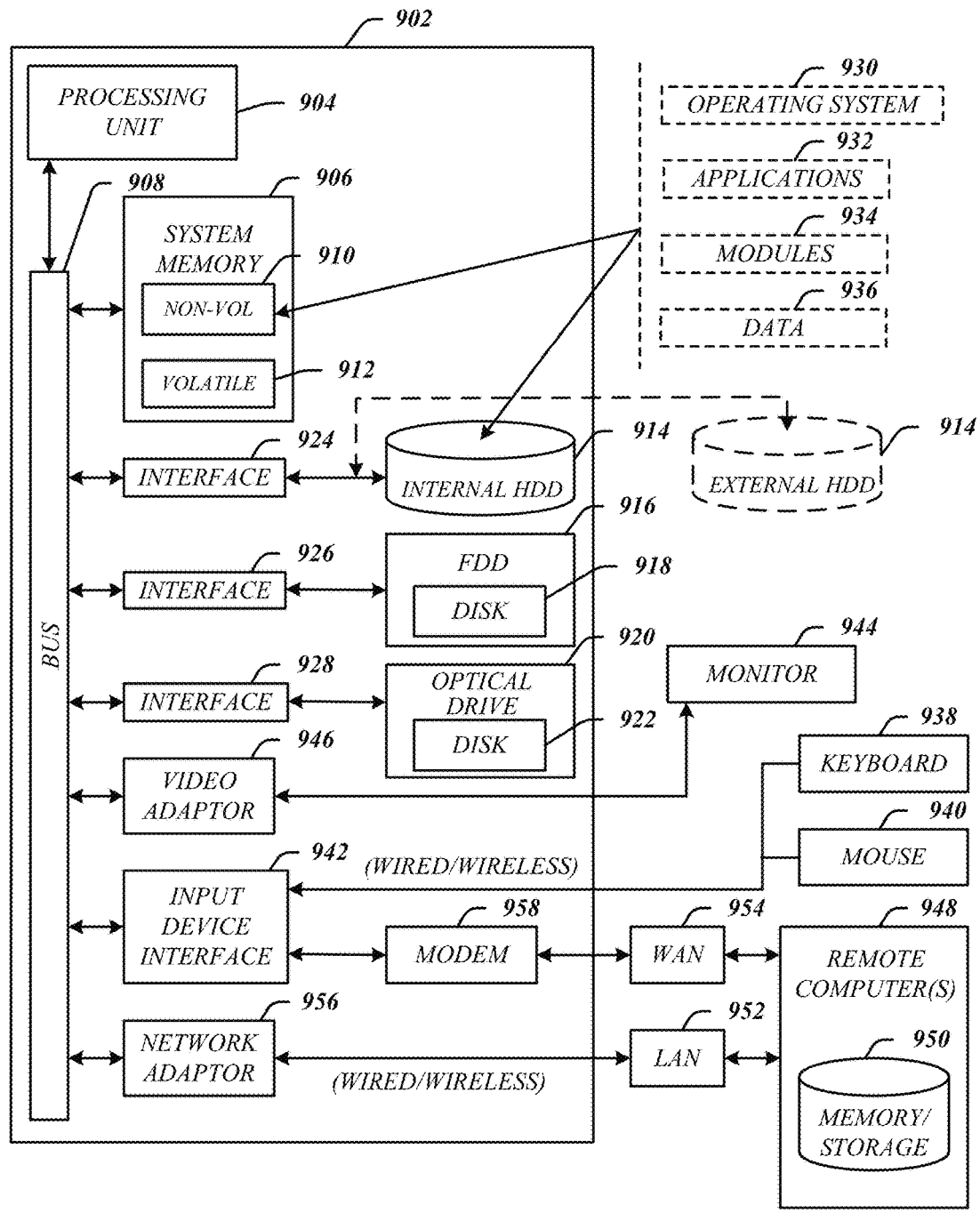
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the contact record management system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
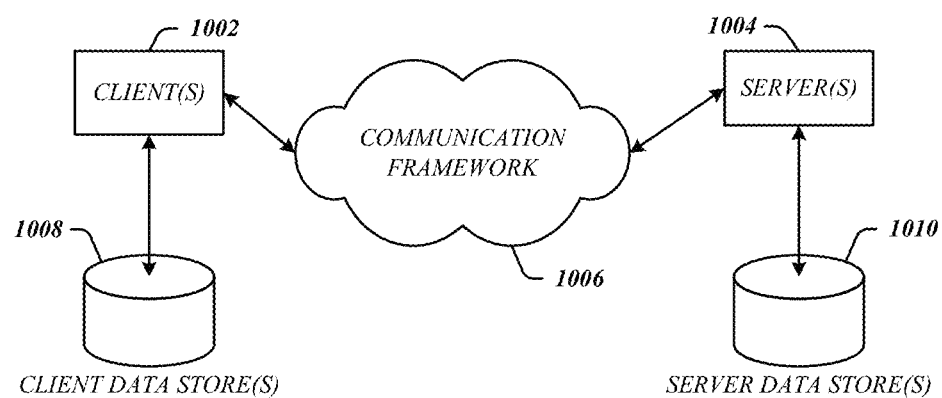
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may comprise the messaging clients. The servers 1004 may comprise messaging servers 110. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
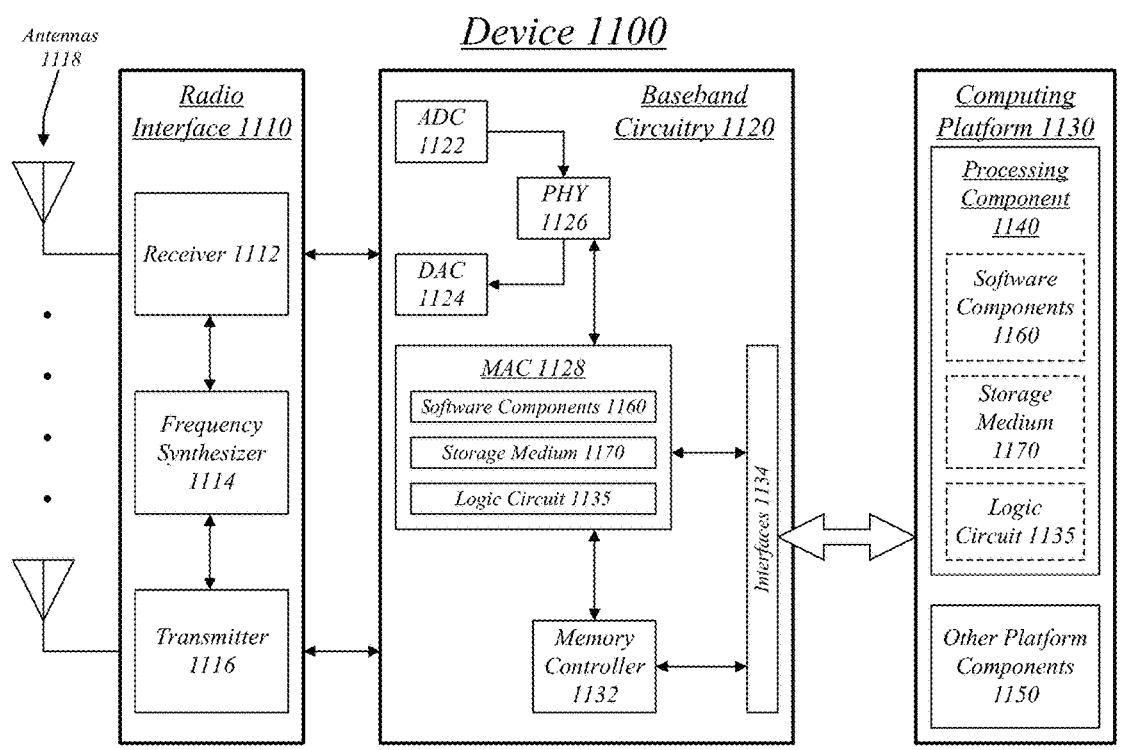
FIG. 11 illustrates an embodiment of a radio device architecture.

FIG. 11 illustrates an embodiment of a device 1100 for use in a multicarrier OFDM system, such as the contact record management system 100. Device 1100 may implement, for example, software components 1160 as described with reference to contact record management system 100 and/or a logic circuit 1135. The logic circuit 1135 may include physical circuits to perform operations described for the contact record management system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the contact record management system 100 and/or logic circuit 1135 in a single computing entity, such as entirely within a single device. Alternatively, the device 1100 may distribute portions of the structure and/or operations for the contact record management system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the contact record management system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a user contact record at a client device; storing the user contact record in a contact record repository on the client device; receiving an incoming messaging initiation at the client device from an initiating user account; matching the initiating user account to the user contact record in the contact record repository; extracting contact information from the user contact record; and displaying an incoming messaging initiation dialog on the client device, the incoming messaging initiation dialog comprising the contact information.

An apparatus may comprise a messaging component operative to receive a user contact record at a client device and to receive an incoming messaging initiation at the client device from an initiating user account; a contact management component operative to store the user contact record in a contact record repository on the client device, to match the initiating user account to the user contact record in the contact record repository and to extract contact information from the user contact record; and a user interface component operative to display an incoming messaging initiation dialog on the client device, the incoming messaging initiation dialog comprising the contact information. The apparatus may be operative to implement any of the computer-implemented methods described herein.

At least one computer-readable storage medium comprising instructions that, when executed, cause a system to receive a user contact record at a client device; store the user contact record in a contact record repository on the client device; receive an incoming messaging initiation at the client device from an initiating user account; match the initiating user account to the user contact record in the contact record repository; extract contact information from the user contact record; and display an incoming messaging initiation dialog on the client device, the incoming messaging initiation dialog comprising the contact information. The computer-readable storage medium may comprise instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
   receive a user contact record in a messaging thread at a client device from a sending user, the user contact record associated with a user other than the sending user;
   determine that the user contact record is authenticated for storage in a contact record repository on the client device, the authentication being based on the identity of the sending user;
   based on the determination that the user contact record is authenticated, store the user contact record in the contact record repository on the client device;
   receive an incoming messaging initiation at the client device from an initiating user account;
   search the contact record repository for a user contact record containing information matching identifying information of the initiating user account;
   extract contact information from the matching user contact record;
   display an incoming messaging initiation dialog on the client device, the incoming messaging initiation dialog comprising information from the matching user contact record and a contact add control;
   receive a user selection of the contact add control; and
   add information from the matching contact record as an entry in an address book on the client device, the address book being separate from the contact record repository.

2. The non-transitory computer-readable storage medium of claim 1
   wherein the user contact record is authenticated for storage in the contact record repository based on the sending user being a participant in the message thread.

3. The non-transitory computer-readable storage medium of claim 1,
   wherein the user contact record is authenticated for storage in the contact record repository based on the sending user matching an address book entry in an address book for the client device.

4. The non-transitory computer-readable storage medium of claim 1, comprising further instructions that, when executed, cause a system to:
   match the initiating user account to a plurality of user contact records in the contact record repository, the plurality of user contact records comprising the user contact record;
   display information from the plurality of user contact records in the incoming messaging initiation dialog;
   display messaging context for the plurality of user contact records in the incoming messaging initiation dialog;
   receive a record contact selection for the incoming messaging initiation dialog, the record contact selection corresponding to a selected user contact record of the plurality of user contact records; and
   add an address book entry for the selected user contact record to an address book for the client device in response to receiving the record contact selection.

5. The non-transitory computer-readable storage medium of claim 1, the incoming messaging initiation comprising an incoming phone number, the user contact record comprising a user contact phone number, comprising further instructions that, when executed, cause a system to:
   match the initiating user account to the user contact record by matching the incoming phone number to the user contact phone number.

6. The non-transitory computer-readable storage medium of claim 1, comprising further instructions that, when executed, cause a system to:
   determine that the initiating user account does not match any existing address book entry in an address book for the client device; and
   match the initiating user account to the user contact record in the contact record repository in response to determining that the initiating user account does not match any existing address book entry in the address book for the client device.

7. The non-transitory computer-readable storage medium of claim 1, comprising further instructions that, when executed, cause a system to:
   receive the user contact record in association with a message thread, the incoming messaging initiation dialog comprising messaging context for receiving the user contact record in association with the message thread.

8. The non-transitory computer-readable storage medium of claim 1, comprising further instructions that, when executed, cause a system to:
   select the incoming messaging initiation dialog for display on the client device in place of a spam reporting dialog based on matching the initiating user account to the user contact record in the contact record repository.

9. The non-transitory computer-readable storage medium of claim 1, the user contact record received as an ephemeral user contact record, wherein the incoming messaging initiation is received prior to an extinction time for the ephemeral user contact record.

10. An apparatus, comprising:
    a messaging component operative to receive a user contact record in a messaging thread at a client device from a sending user, the user contact record associated with a user other than the sending user; and receive an incoming messaging initiation at the client device from an initiating user account;
    a contact management component operative to:
       determine that the user contact record is authenticated for storage in a contact record repository on the client device, the authentication being based on the identity of the sending user;

based on the determination that the user contact record is authenticated, store the user contact record in a contact record repository on the client device;

match the initiating user account to a user contact record in the contact record repository; and extract contact information from the user contact record;

receive a user selection of a contact add control; and add information from the matching contact record as an entry in an address book on the client device, the address book being separate from the contact record repository; and a user interface component operative to display an incoming messaging initiation dialog on the client device, the incoming messaging initiation dialog comprising the contact information and the contact add control.

11. The apparatus of claim 10 wherein the user contact record is authenticated for storage in the contact record repository based on the sending user being a participant in the message thread.

12. The apparatus of claim 10 wherein the user contact record is authenticated for storage in the contact record repository based on the sending user matching an address entry in an address book for the client device.

13. The apparatus of claim 10, further comprising:
the contact management component operative to match the initiating user account to a plurality of user contact records in the contact record repository, the plurality of user contact records comprising the user contact record; and add an address book entry for a selected user contact record to an address book for the client device in response to receiving a record contact selection; and the user interface component operative to display record contact information from the plurality of user contact records in the incoming messaging initiation dialog; display messaging context for the plurality of user contact records in the incoming messaging initiation dialog; and receive the record contact selection for the incoming messaging initiation dialog, the record contact selection corresponding to the selected user contact record of the plurality of user contact records.

14. The apparatus of claim 10, the incoming messaging initiation comprising an incoming phone number, the user contact record comprising a user contact phone number, further comprising:
the contact management component operative to match the initiating user account to the user contact record by matching the incoming phone number to the user contact phone number.

15. The apparatus of claim 10, further comprising:
the contact management component operative to determine that the initiating user account does not match any existing address book entry in an address book for the client device; and match the initiating user account to the user contact record in the contact record repository in response to determining that the initiating user account does not match any existing address book entry in the address book for the client device.

16. The apparatus of claim 10, further comprising:
the messaging component operative to receive the user contact record in association with a message thread, the incoming messaging initiation dialog comprising messaging context for receiving the user contact record in association with the message thread.

17. The apparatus of claim 10, further comprising:
the user interface component operative to select the incoming messaging initiation dialog for display on the client device in place of a spam reporting dialog based on matching the initiating user account to the user contact record in the contact record repository.

18. A computer-implemented method, comprising:
receiving a user contact record in a messaging thread at a client device from a sending user, the user contact record associated with a user other than the sending user;

determining that the user contact record is authenticated for storage in a contact record repository on the client device, the authentication being based on the identity of the sending user;

based on the determination that the user contact record is authenticated, storing the user contact record in the contact record repository on the client device;

receiving an incoming messaging initiation at the client device from an initiating user account;

searching the contact record repository for a user contact record containing information matching identifying information of the initiating user account;

extracting contact information from the matching user contact record; and displaying an incoming messaging initiation dialog on the client device, the incoming messaging initiation dialog comprising information and a contact add control;

receiving a user selection of the contact add control; and adding information from the matching contact record as an entry in an address book on the client device, the address book being separate from the contact record repository.

* * * * *